United States Patent
Zhang et al.

(10) Patent No.: US 10,782,839 B2
(45) Date of Patent: Sep. 22, 2020

(54) TOUCH SUBSTRATE, METHOD FOR MANUFACTURING THE SAME, AND DISPLAY APPARATUS

(71) Applicants: HEFEI XINSHENG OPTOELECTRONICS TECHNOLOGY CO., LTD., Anhui (CN); BOE Technology Group Co., Ltd., Beijing (CN)

(72) Inventors: Guiyu Zhang, Beijing (CN); Zouming Xu, Beijing (CN); Lei Zhang, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/462,076

(22) PCT Filed: Oct. 31, 2018

(86) PCT No.: PCT/CN2018/113034
§ 371 (c)(1),
(2) Date: May 17, 2019

(87) PCT Pub. No.: WO2019/169882
PCT Pub. Date: Sep. 12, 2019

(65) Prior Publication Data
US 2020/0272281 A1    Aug. 27, 2020

(30) Foreign Application Priority Data
Mar. 8, 2018 (CN) .......................... 2018 1 0192264

(51) Int. Cl.
*G06F 3/044* (2006.01)
*G06F 3/041* (2006.01)

(52) U.S. Cl.
CPC .......... *G06F 3/0446* (2019.05); *G06F 3/0416* (2013.01); *G06F 3/0443* (2019.05);
(Continued)

(58) Field of Classification Search
CPC .... G06F 3/0446; G06F 3/0443; G06F 3/0416; G06F 2203/04103; G06F 2203/04111
See application file for complete search history.

(56) References Cited

U.S. PATENT DOCUMENTS 9,996,188 B2    6/2018  Li et al.
2014/0346027 A1  11/2014  Li et al.
(Continued)

FOREIGN PATENT DOCUMENTS

CN    104182072 A    12/2014
CN    104866142 A     8/2015
(Continued)

OTHER PUBLICATIONS

International Search Report and Written Opinion (including English translations of search report and Box V of Written Opinion) for International Application No. PCT/CN2018/113034, dated Jan. 30, 2019, 10 pages.
(Continued)

*Primary Examiner* — Charles V Hicks
(74) *Attorney, Agent, or Firm* — Westman, Champlin & Koehler, P.A.

(57) ABSTRACT

The embodiments of the present application propose a touch substrate, a method for manufacturing the touch substrate, and a display apparatus. The touch substrate includes: a base substrate, an electrode pattern, an insulating layer, first conductive bridges and second conductive bridges. The
(Continued)

electrode pattern includes a plurality of first electrodes and a plurality of second electrodes. The second electrodes are disconnected at positions of the plurality of first electrodes, are insulated from the plurality of first electrodes, and have first gaps set between adjacent second electrodes thereof. The first electrodes are disconnected at the first gaps. The insulating layer is disposed on one side of the electrode pattern which is away from the base substrate. The first conductive bridges and the second conductive bridges are disposed on one side of the insulating layer which is away from the base substrate, and are configured to electrically connect various portions of respective first electrodes and electrically connect various portions of respective second electrodes.

20 Claims, 9 Drawing Sheets

(52) U.S. Cl.
CPC .............. *G06F 2203/04103* (2013.01); *G06F 2203/04111* (2013.01)

(56) References Cited

U.S. PATENT DOCUMENTS

| | | |
|---|---|---|
| 2016/0299599 A1 | 10/2016 | Kang et al. |
| 2017/0090622 A1* | 3/2017 | Badaye ................ G06F 3/044 |
| 2017/0147124 A1 | 5/2017 | Li et al. |
| 2018/0158876 A1 | 6/2018 | Shi |
| 2019/0204975 A1 | 7/2019 | Xie et al. |

FOREIGN PATENT DOCUMENTS

| | | |
|---|---|---|
| CN | 105742330 A | 7/2016 |
| CN | 107066160 A | 8/2017 |
| CN | 107450772 A | 12/2017 |
| CN | 107632740 A | 1/2018 |
| JP | 2012-141690 A | 7/2012 |

OTHER PUBLICATIONS

Office Action, including Search Report, for Chinese Patent Application No. 201810192264.X, dated Dec. 3, 2019, 25 pages.

* cited by examiner

TOUCH SUBSTRATE, METHOD FOR MANUFACTURING THE SAME, AND DISPLAY APPARATUS

CROSS-REFERENCE TO RELATED APPLICATION(S)

The present application is a Section 371 National Stage application of International Application No. PCT/CN2018/113034, which was filed on 31 Oct. 2018, and claims priority to Chinese Patent Application 201810192264.X, filed on Mar. 8, 2018, the contents of which are incorporated herein by reference in their entireties.

TECHNICAL FIELD

The present disclosure relates to the touch field, and more particularly, to a touch substrate, a method for manufacturing the same, and a display apparatus.

BACKGROUND

With the advancement and development of technology, electronic devices (for example, smart phones, tablets, etc.) with touch functions have become an indispensable part of people's production and life. With the advent of flexible electronic devices, flexible touch technology also becomes one of research hotspots. In addition to the current conventional handheld devices, the flexible touch technology will also show great application prospects in terms of touch of wearable devices in the future. Regardless of the use of the flexible devices, human-computer interaction is indispensable, and realization of the human-computer interaction is inevitably related to touch.

SUMMARY

According to an aspect, the embodiments of the present disclosure propose a touch substrate. The touch substrate comprises: a base substrate; an electrode pattern, comprising a plurality of first electrodes extending in a first direction and a plurality of second electrodes extending in a second direction intersecting the first direction, wherein the plurality of second electrodes and the plurality of first electrodes are in the same layer and constitute a plurality of touch units arranged in an array, wherein the second electrodes are disconnected at positions of the plurality of first electrodes, are insulated from the plurality of first electrodes, and have first gaps set between adjacent second electrodes thereof, and the first electrodes are disconnected at the first gaps; an insulating layer disposed on one side of the electrode pattern which is away from the base substrate, wherein the insulating layer has a plurality of first via holes and a plurality of second via holes disposed therein; first conductive bridges disposed on one side of the insulating layer which is away from the base substrate, wherein an orthographic projection of each of the first conductive bridges on the base substrate is at least partially overlapped with an orthographic projection of a corresponding one of the plurality of first via holes on the base substrate, and the first conductive bridges are configured to electrically connect portions of respective first electrodes on opposite sides of respective first gaps; and second conductive bridges disposed on one side of the insulating layer which is away from the base substrate, wherein an orthographic projection of each of the second conductive bridges on the base substrate is at least partially overlapped with an orthographic projection of a corresponding one of the plurality of second via holes on the base substrate, and the second conductive bridges are configured to electrically connect disconnected portions of respective second electrodes.

In some embodiments, the second electrodes are further configured to be disconnected at second gaps, which are located between adjacent ones of the touch units in the second direction. In some embodiments, the touch substrate further comprises: signal lines extending in the first direction, wherein the signal lines are located at the second gaps, and are disposed in the same layer as the electrode pattern, wherein the signal lines are electrically connected to at least one of the plurality of second electrodes, and the signal lines are configured to perform at least one of: transmitting a control signal to the second electrode electrically connected thereto or receiving a sensing signal from the second electrode electrically connected thereto. In some embodiments, the insulating layer further has a plurality of third via holes disposed therein, and the touch substrate further comprises: third conductive bridges disposed on one side of the insulating layer which is away from the base substrate, wherein an orthographic projection of each of the third conductive bridges on the base substrate is at least partially overlapped with an orthographic projection of a corresponding one of the plurality of third via holes on the base substrate, and the third conductive bridges are configured to electrically connect portions of respective second electrodes on opposite sides of respective second gaps. In some embodiments, the electrode pattern further comprises: at least one dummy electrode disposed in the same layer as the first electrodes and the second electrodes and extending in the first direction, wherein the dummy electrodes are insulated from the first electrodes and the second electrodes, and different dummy electrodes are spaced apart by the first electrodes or the second electrodes. In some embodiments, the first electrodes and the second electrodes are formed of the same material. In some embodiments, the signal lines, the first electrodes, and the second electrodes are formed of the same material. In some embodiments, the dummy electrodes, the first electrodes, and the second electrodes are formed of the same material. In some embodiments, the first direction is perpendicular to the second direction. In some embodiments, material of the first electrodes and the second electrodes comprises indium tin oxide and/or a silver palladium copper alloy.

According to another aspect, the embodiments of the present disclosure propose a method for manufacturing a touch substrate. The method comprises: forming an electrode pattern on a base substrate, wherein the electrode pattern comprises a plurality of first electrodes extending in a first direction and a plurality of second electrodes extending in a second direction intersecting the first direction, wherein the plurality of second electrodes and the plurality of first electrodes are in the same layer and constitute a plurality of touch units arranged in an array, the second electrodes are formed to be disconnected at positions of the plurality of first electrodes, are insulated from the plurality of first electrodes, and have first gaps set between adjacent second electrodes thereof, and the first electrodes are formed to be disconnected at the first gaps; forming an insulating layer on one side of the electrode pattern which is away from the base substrate; forming a plurality of first via holes and a plurality of second via holes in the insulating layer; and forming first conductive bridges and second conductive bridges on one side of the insulating layer which is away from the base substrate, wherein the first conductive bridges are formed to electrically connect portions of respective first electrodes on opposites sides of respective first gaps via the first via holes, and the second conductive bridges are formed to electrically connect disconnected portions of respective second electrodes via the second via holes.

In some embodiments, the second electrodes are further formed to be disconnected between adjacent ones of the touch units in the second direction to form second gaps. In some embodiments, the method further comprises: forming signal lines extending in the first direction at the second gaps on the base substrate, wherein the signal lines are disposed in the same layer as the electrode pattern, wherein the signal lines are formed to be electrically connected to at least one of the plurality of second electrodes. In some embodiments, the method further comprises: forming a plurality of third via holes in the insulating layer; and forming third conductive bridges on one side of the insulating layer which is away from the base substrate, wherein the third conductive bridges are formed to electrically connect portions of respective second electrodes on opposite sides of the respective second gaps via the third via holes. In some embodiments, the electrode pattern is further formed to comprise: at least one dummy electrode disposed in the same layer as the first electrodes and the second electrodes and extending in the first direction, wherein the dummy electrodes are insulated from the first electrodes and the second electrodes, and different dummy electrodes are spaced apart by the first electrodes or the second electrodes. In some embodiments, the first electrodes and the second electrodes are formed of the same material. In some embodiments, the signal lines, the first electrodes, and the second electrodes are formed of the same material. In some embodiments, the dummy electrodes, the first electrodes, and the second electrodes are formed of the same material. In some embodiments, the first direction is perpendicular to the second direction. In some embodiments, material of the first electrodes and the second electrodes comprises indium tin oxide and/or a silver palladium copper alloy.

According to yet another aspect, the embodiments of the present disclosure propose a display apparatus. The display apparatus comprises the touch substrate described above.

BRIEF DESCRIPTION OF THE DRAWINGS

The above and other purposes, features and advantages of the present disclosure will become more apparent from the following preferred embodiments of the present disclosure in conjunction with the accompanying drawings, in which.

DETAILED DESCRIPTION

Figure 1:
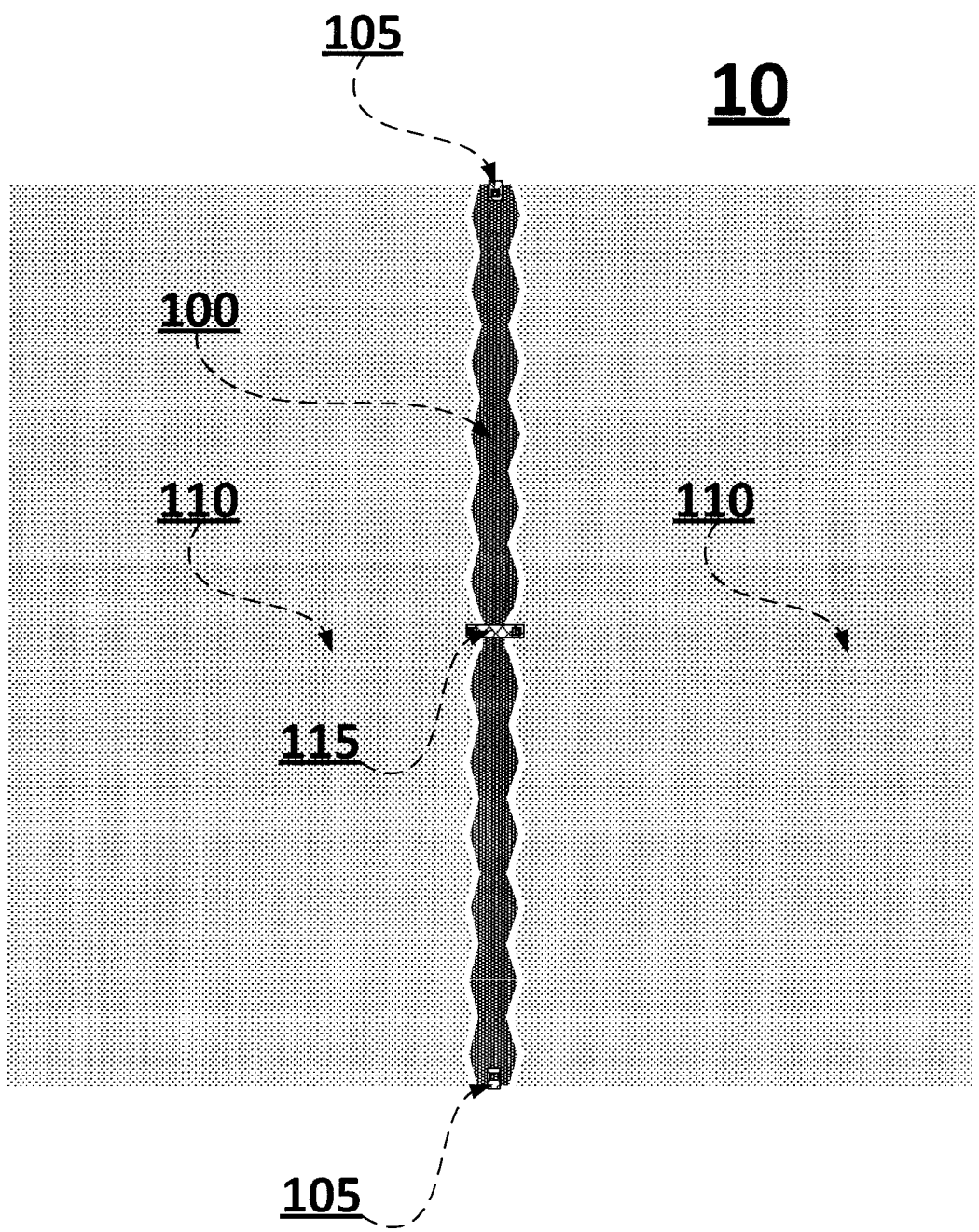
FIG. 1 is a top view illustrating an exemplary touch unit according to an embodiment of the present disclosure.

A part of the embodiments of the present disclosure will be described in detail below with reference to the accompanying drawings, and the details and functions which are not necessary for the present disclosure are omitted in the description, to avoid confusion of the understanding of the present disclosure. In the present specification, various embodiments described below for describing the principles of the present disclosure are merely illustrative and should not be construed as limiting the scope of the present disclosure in any way. The following description with reference to the accompanying drawings comprises numerous specific details are used to assist in a comprehensive understanding of the exemplary embodiments of the present disclosure which are defined by the claims and their equivalents. The following description comprises numerous specific details to assist in the understanding, but these details should be considered to be merely exemplary. Therefore, it will be apparent to those of ordinary skill in the art that various changes and modifications may be made to the embodiments described herein without departing from the scope and spirit of the present disclosure. In addition, descriptions of well-known functions and constructions are omitted for clarity and conciseness. In addition, the same reference signs are used throughout the accompanying drawings for the same or similar functions, devices and/or operations. In addition, in the accompanying drawings, various parts are not necessarily drawn to scale. In other words, relative sizes, lengths, etc. of various parts in the accompanying drawings do not necessarily correspond to actual ratios.

In the present disclosure, the terms "comprise" and "comprising" and their derivatives are intended to be inclusive and not limiting; and the term "or" is inclusive, meaning and/or. In addition, in the following description of the present disclosure, the orientation terms used, such as "upper", "lower", "left", "right", etc., are used to indicate relative positional relationships to assist those skilled in the art in understanding the embodiments of the present disclosure. Further, it should be understood by those skilled in the art that "upper"/"lower" in one direction may become "lower"/"upper" in an opposite direction, and may become another positional relationship, such as "left"/"right", etc., in another direction.

Hereinafter, various embodiments will be described in detail by taking the embodiments of the present disclosure being applied to the field of flexible touch display as an example. However, it should be understood by those skilled in the art that in some other embodiments of the present disclosure, the embodiments of the present disclosure may also be applied to the field of rigid touch display. In addition, although the touch solution according to the embodiments of the present disclosure is described in detail below using "mutual capacitive touch screens" as an example in the present disclosure, the present disclosure is not limited thereto. In fact, in some other embodiments of the present disclosure, the touch solution according to the embodiments of the present disclosure may also be applied to "self-capacitive touch screens", resistive touch screens" or any other rigid/flexible touch screen design.

A problem with flexible touch electronic devices (for example, flexible touch electronic devices using a capacitive projection touch screen) is their poor bendability. Although metal materials (for example, copper (Cu)) having excellent ductility may be used to compensate for poor bendability, the metal materials generally have disadvantages such as poor optical transparency. At the same time, although transparent materials have a good optical visual effect, the transparent materials have worse ductility than the metal materials. How to achieve both high transparency and high ductility is an urgent problem to be solved.

In addition, although the demands for electronic devices with a narrow bezel or electronic devices without a bezel are increasing, signal lines are currently required to be arranged on opposite sides of a touch screen, and therefore it is difficult to really realize a design without a bezel.

Therefore, in order to achieve a balance between the optical effect and the bendability and realize a design without a bezel, it is necessary to solve the above problems according to a design of touch units by designing a pattern of the touch units.

In order to at least partially solve or alleviate the above problems, the present disclosure provides a touch substrate, a method for manufacturing the same, and a display apparatus. Various embodiments of the present disclosure will be described in detail below with reference to the accompanying drawings.

Firstly, a touch substrate, configuration of touch units on the touch substrate and an array arrangement of the touch units according to an embodiment of the present disclosure will be described in detail with reference to FIGS. 1 and 2.

FIG. 1 is a top view illustrating an exemplary touch unit 10 on a touch substrate according to an embodiment of the present disclosure. FIG. 2 is a top view illustrating a plurality of exemplary touch units 10 arranged in an array according to an embodiment of the present disclosure.

As shown in FIG. 1, the touch unit 10 may be a touch unit 10 with a mutual capacitive touch design, which may comprise a first electrode 100 extending in, for example, a vertical direction and a second electrode 110 extending in, for example, a horizontal direction. In the embodiment shown in FIG. 1, the second electrode 110 may be a driving electrode (or emitter electrode or Tx), and the first electrode 100 may be a sensing electrode (or receiver electrode or Rx). However, the present disclosure is not limited thereto. For example, in some other embodiments, the first electrode 100 may be designed as a driving electrode and the second electrode 110 may be designed as a sensing electrode.

In the embodiment shown in FIG. 1, in the touch unit 10, the second electrode 110 is disconnected at a position of the first electrode 100, that is, the second electrode 110 is divided into a plurality of (for example, in the embodiment, two) portions by the first electrode. Each of the portions is electrically insulated from the first electrode 100, and the plurality of portions of the second electrode 110 are electrically connected to each other through a second conductive bridge 115 by way of bridging. The second conductive bridge 115 may bypass the first electrode 100 as shown in FIG. 3C. As shown in FIG. 3C, the second conductive bridge 115 may be disposed on one side of an insulating layer 140 away from a base substrate 150, and may be configured to electrically connect the plurality of portions (for example, two adjacent portions) of the second electrode 110 through a via hole (i.e., a second via hole) on the insulating layer 140 in the horizontal direction in FIG. 1. Specifically, an orthographic projection of the second conductive bridge 115 on the base substrate is at least partially overlapped with an orthographic projection of a corresponding one of a plurality of second via holes on the base substrate, so that the second conductive bridge 115 electrically connects the disconnected portions of the second electrode 110 at the first electrode 100. Further, the first electrode 100 and the second electrode 110 may be disposed in the same layer as shown in FIG. 3C, and may be made of the same material as described below. However, the present disclosure is not limited thereto. The first electrode 100 may also be disposed in a different layer from the second electrode 110. In addition, the first electrode 100 may also be formed of a different material from the second electrode 110. For example, as described below, one of the first electrode 100 and the second electrode 110 may be formed of ITO, and the other may be formed of a silver palladium copper (APC) alloy etc.

In addition, it should be illustrated that in the present disclosure, the "vertical direction" in FIG. 1 may be referred to as a "first direction" and the "horizontal direction" in FIG. 1 may be referred to as a "second direction" without loss of generality. However, it should be understood that the first direction and the second direction are not limited to the vertical direction and the horizontal direction, but may be any different directions which may intersect each other, for example, two directions with an angle of 45 degrees therebetween, etc., or the first direction is the horizontal direction, and the second direction is the vertical direction etc.

Further, as shown in FIG. 1, the above respective portions (for example, the first electrode 100 and the second electrode 110, etc.) are also electrically insulated from each other by a gap or an insulating material (for example, shown by a blank line in FIG. 1).

According to an embodiment of the present disclosure, the second electrode 110 may be configured to conduct a driving signal. The driving signal may generally be a periodic oscillating signal. In a case where mutual capacitance between the first electrode 100 and the second electrode 110 changes due to an action such as touch using a finger, a stylus etc., a period/frequency of the oscillating signal changes therewith, and thereby an output signal of the first electrode 100 changes, and may be detected by a driving circuit (for example, a driving circuit (IC) of a touch panel or a driving circuit of a touch display) connected to the first electrode 100. In this regard, the first electrode 100 may be configured to sense a change in the mutual capacitance between the first electrode 100 and the second electrode 110.

Figure 2:
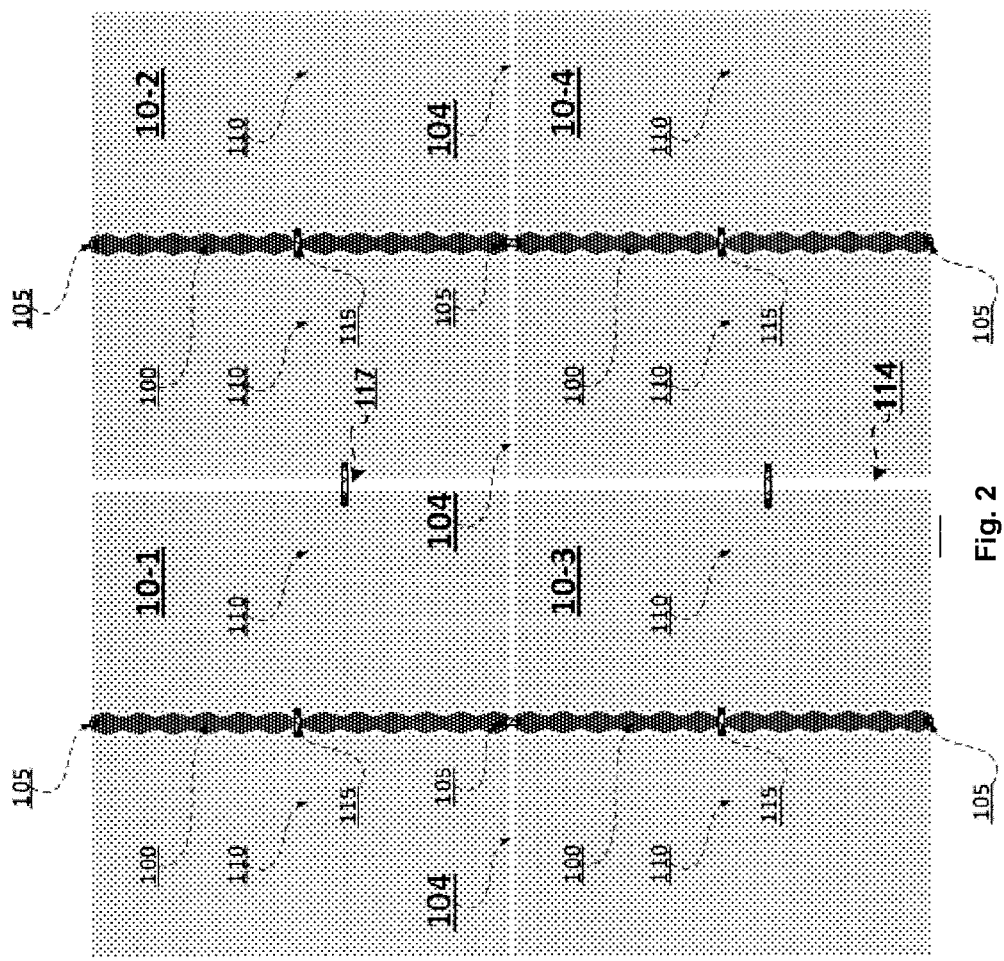
FIG. 2 is a top view illustrating a plurality of exemplary touch units arranged in an array according to an embodiment of the present disclosure.

In addition, as shown in FIG. 2, vertically adjacent ones of touch units 10 (comprising, for example, touch units 10-1, 10-2, 10-3, 10-4, etc., which are collectively referred to as touch units 10 hereinafter, unless otherwise specified) arranged in an array on the touch substrate may have gaps 104 formed therebetween. For example, in the embodiment shown in FIG. 2, a gap 104 is formed between the touch unit 10-1 and the touch unit 10-3. In the embodiment shown in FIG. 2, a first electrode 100 is disconnected at the gap 104 and disconnected portions of the first electrode 100 are electrically connected through a first conductive bridge 105 by way of bridging. This connection relationship exists between adjacent touch units 10-1 and 10-3 arranged in the first direction and between adjacent touch units 10-2 and 10-4 arranged in the first direction. In the embodiment shown in FIG. 2, each touch unit 10 comprises only one second electrode 110. Therefore, the gap 104 is a gap between adjacent second electrodes 110. It should be understood that the present disclosure is not limited thereto.

Similarly to the second conductive bridge 115, the first conductive bridge 105 may be disposed on one side of the insulating layer 140 away from the base substrate 150 and may be configured to electrically connect the plurality of portions (for example, two adjacent portions) of the first electrode 100 through a via hole (i.e., a first via hole) on the insulating layer 140 in the vertical direction in FIG. 1. Specifically, an orthographic projection of the first conductive bridge 105 on the base substrate 150 is at least partially overlapped with an orthographic projection of a corresponding one of a plurality of first via holes on the base substrate 150, so that the disconnected portions of the first electrode 100 at the gap 104 are electrically connected by the first conductive bridge 105.

The gap 104 may be formed in a process of forming patterns of the touch units 10 as described below in conjunction with FIGS. 3A-3C, or may be formed subsequently by, for example, laser, etching, etc. after the process of the entire touch panel is completed.

In a design of, for example, a flexible touch unit, the gap 104 may become a release space for internal stress generated by the touch panel when the touch panel is bent (with, for example, the gap 104 as an axis), thereby avoiding or at least reducing possible mechanical damages, for example, breakage, tearing, etc., to the device. It should be illustrated that the gap 104 may be a gap without a filling material. However, the present disclosure is not limited thereto, and in fact the gap 104 may also be filled with a flexible material which may be compressed.

It should be illustrated that although in the embodiment shown in FIG. 2, the gap 104 is a gap throughout the entire touch panel, the present disclosure is not limited thereto. The gap 104 may be partially present. For example, there may be a gap 104 between the touch units 10-1 and 10-3, and there may not be a gap 104 between the touch units 10-2 and 10-4 (i.e., the first electrode 100 is not disconnected here, and therefore, it is not necessary to perform bridging for connection). This is due, at least in part, to the fact that when there is a gap 104 throughout the entire row, the entire touch display may be bent intensively, which results in tearing or breakage of an underlying base substrate/flexible display panel due to the lack of protection by a touch panel layer. Therefore, it is necessary to retain portions without a gap to improve the toughness of the entire touch display.

In addition, in some embodiments, as shown in FIG. 2, gaps 114 may be formed between horizontally adjacent ones of the touch units 10 arranged in an array on the touch substrate. For example, in the embodiment shown in FIG. 2, a gap 114 is formed between the touch unit 10-1 and the touch unit 10-2. In the embodiment shown in FIG. 2, a second electrode 110 is disconnected at the gap 114, and disconnected portions of the second electrode 110 are electrically connected through a third conductive bridge 117 by bridging. This connection relationship exists between adjacent touch units 10-1 and 10-2 arranged in the first direction and between adjacent touch units 10-3 and 10-4 arranged in the first direction. It should be understood that in some embodiments of the present disclosure, there may not be a gap 114, i.e., the second electrode 110 is not disconnected at the gap 114 in FIG. 2, which does not affect the division of the touch units.

The third conductive bridge 117 may be disposed on one side of the insulating layer 140 away from the base substrate 150, and may be configured to electrically connect a plurality of portions (for example, two portions in adjacent touch units) of the second electrode 110 through a via hole (i.e., a third via hole) on the insulating layer 140 in the horizontal direction in FIG. 1. Specifically, an orthographic projection of the third conductive bridge 117 on the base substrate 150 is at least partially overlapped with an orthographic projection of a corresponding one of a plurality of third via holes on the base substrate 150, so that disconnected portions of the second electrode 110 at the gap 114 are electrically connected by the third conductive bridge 117.

In addition, in the embodiment shown in FIG. 2, in addition to the gaps 104 between adjacent ones (for example, the touch units 10-1 and 10-3) of the plurality of touch units 10, there may also be a gap between a touch unit 10 at an edge of the panel and an adjacent bonding region, for example, between an outermost one of the touch units 10 arranged in an array which is close to a bonding region and the bonding region. Therefore, similarly, a first electrode 100 in the touch unit 10 may be electrically connected to a corresponding lead of an adjacent bonding region by a conductive bridge similar to the first conductive bridge 105 described above.

Further, although there is only one first electrode 100 extending in the first direction in each of the above touch units 10, the embodiments of the present disclosure are not limited thereto. In fact, two, three or more first electrodes 100 extending (for example, in parallel) in the first direction may also be used as described below, which is not limited in the present disclosure. In addition, although description is made by taking the mutual capacitive touch solution as an example in the above embodiments, the present disclosure is not limited thereto. For example, a self-capacitive touch solution may also be implemented by disposing gaps between the respective touch units and connecting the touch units using the respective first conductive bridges, so as to ensure that the internal stress is released.

Next, an exemplary method for manufacturing touch units according to an embodiment of the present disclosure will be described in detail with reference to FIGS. 3A to 3C.

Figure 3A:
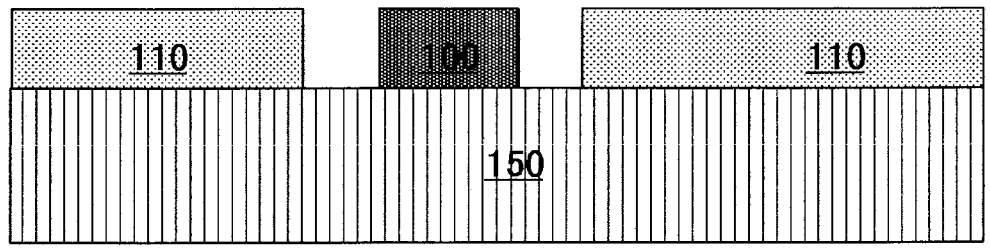
FIGS. 3A-3C are partial cross-sectional views illustrating a touch substrate in various manufacturing phases according to an embodiment of the present disclosure.
Figure 3B:
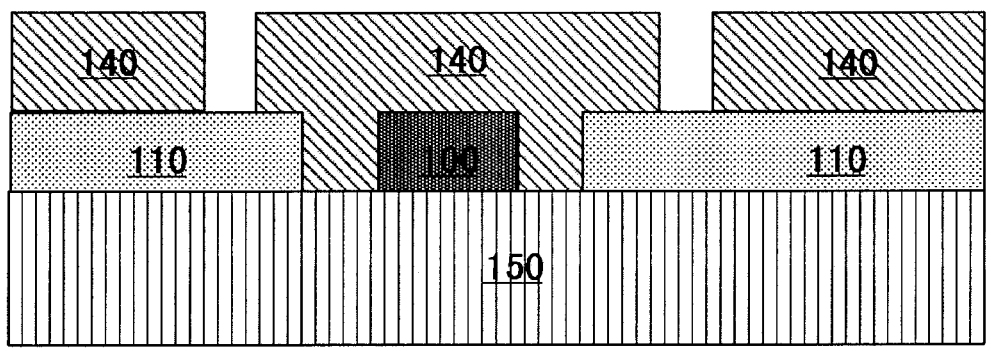
Figure 3C:
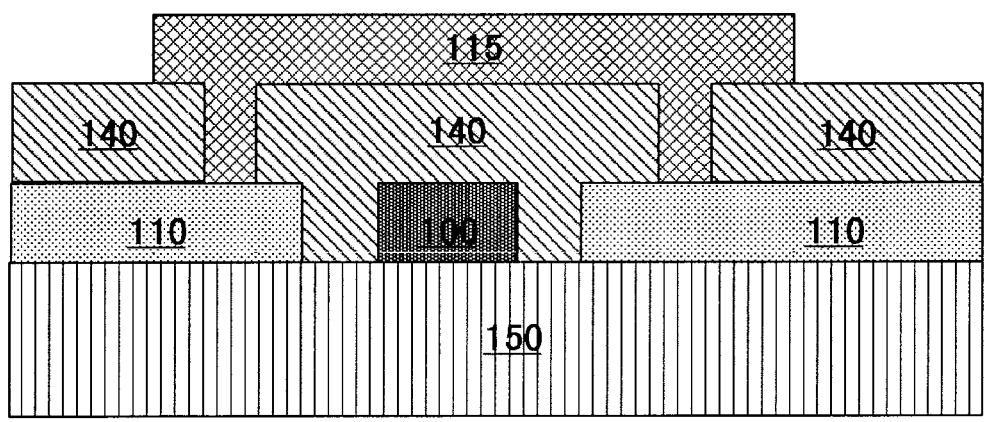

FIGS. 3A-3C are partial cross-sectional views illustrating a touch substrate in various phases of an exemplary method for manufacturing the touch substrate according to an embodiment of the present disclosure. As shown in FIG. 3A, a pattern layer of various electrodes 100 and/or 110 may be formed by performing magnetron sputtering on, for example, a flexible and/or rigid base substrate (of, for example, Cycio Olefins Polymer (COP), Polyethylene terephthalate (PET), glass, etc.) This layer may be made of a transparent ITO conductive material, and a desired electrode pattern is formed by a yellow light process, comprising steps such as photoresist coating, exposure, development, etching, etc. Further, in this step, patterns of gaps (for example, the gaps 104, which may be shown by a cross section parallel to that shown in FIG. 3A) between patterns of the respective touch units 10 may also be formed at the same time. Alternatively, in some other embodiments, various gaps (for example, the gaps 104) may also be formed by, for example, laser, etching, etc. after the above patterns are formed.

Next, as shown in FIG. 3B, an intermediate insulating layer 140 may be formed by, for example, vapor deposition or coating. The insulating layer 140 may be formed by a transparent organic layer (of, for example, Optical Clear Adhesive (OCA), polyimide (PI), etc.) or a transparent inorganic substance (inorganic silicon oxide material, oxynitride, etc.), and required patterns of the insulating layer 140 may be formed by a yellow light process. Via holes etc.

required in subsequent steps may also be formed while the patterns of the insulating layer 140 are formed. Likewise, the via holes formed in this layer may also be subsequently formed by, for example, laser, etching, etc. after the insulating layer 140 is formed, instead of being formed while the patterns of the insulating layer 140 are formed.

As shown in FIG. 3C, the first conductive bridges 105 and/or the second conductive bridges 115, etc. (the second conductive bridges 115 are used as an example in FIG. 3C) may be formed by magnetron sputtering. Material of the first conductive bridges 105 and/or the second conductive bridges 115 may be the same as that of various electrodes. The desired patterns of the conductive bridges are formed by a yellow light process, comprising, for example, photoresist coating, exposure, development, etching, to complete the manufacturing of the entire touch units 10.

Figure 4:
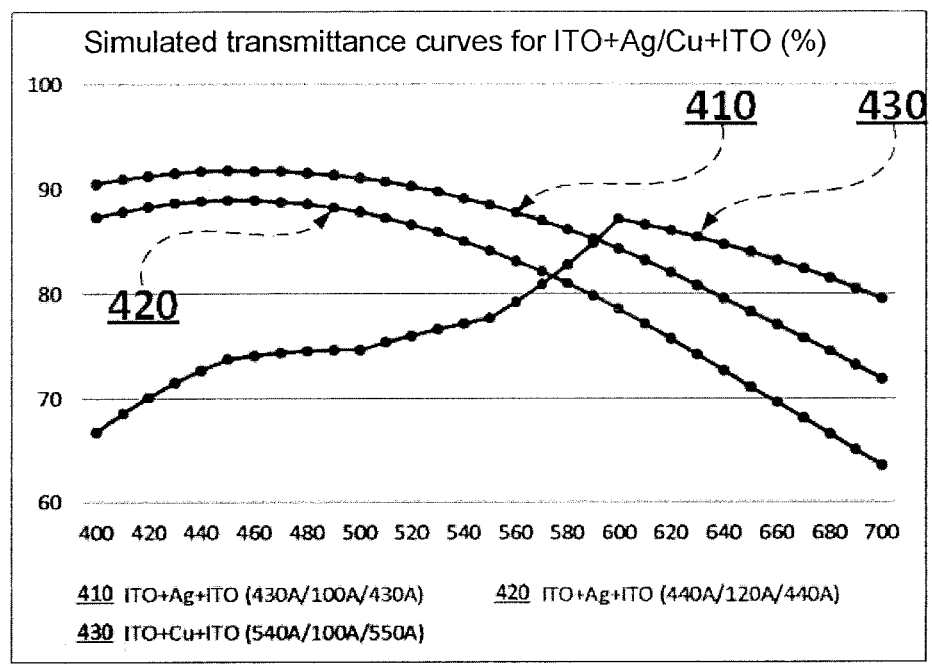
FIG. 4 is a diagram illustrating comparative graphs of light transmittance of touch units made of different materials according to an embodiment of the present disclosure.

Further, in a case where, for example, material of silver palladium copper alloy (APC) is used instead of the material of ITO, a general flow is the same as that shown in FIGS. 3A to 3C, except that it is necessary to reduce a thickness of each APC layer to achieve its high transmittance since APC is generally a non-transparent material. In some embodiments, transparency of the APC layer may reach a level of the transparent ITO layer, as indicated by, for example, simulated transmittance curves shown in FIG. 4. In FIG. 4, transmittance curves of silver (Ag) having different film thicknesses are indicated by marks 410 and 420, and a transmittance curve of copper is indicated by a mark 430. As shown in FIG. 4, in a case where an APC alloy dominated by silver is used, the smaller the film thickness, the higher the transmittance, and the transmittance of the APC alloy may be equivalent to that of the transparent ITO.

Table 1 shows some touch parameters for film layers having square resistance simulation values of 40Ω and 5Ω. As shown in Table 1 below, it may be seen that both the ITO solution and the APC solution may meet the above requirements. However, due to the larger square resistance of the ITO material, the ITO solution is slightly better in touch performance than the conventional single layer structure. However, the ITO solution may have a slightly lower operating frequency range than that of the conventional single layer structure. The APC solution has a good touch effect due to its low square resistance and better transmittance, and as compared with a conventional Single layer ITO (SITO) structure, has a better operating frequency than that of the SITO structure.

TABLE 1

| Parameters | Simulation value of 40 Ω | Simulation value of 5Ω | Reference values |
|---|---|---|---|
| Mutual capacitance (pf) | 1.16 | | ≤4 |
| Screen driving impedance (kΩ) | 15.2 | 1.9 | / |
| Screen induced impedance (kΩ) | 12.9 | 1.6 | / |
| Touch variation for a copper column with a diameter of 7 mm (pf) | 0.16 | | ≥0.1 |
| Attenuation (us) | 1.94 | 0.25 | ≤1 |
| Suspension | | 1.66 | ≥1.5 |

Therefore, with a touch unit, a method for manufacturing the touch unit, a touch substrate comprising the touch unit, a touch panel, and a touch display apparatus according to an embodiment of the present disclosure, compared with a caterpillar type or "E" type single layer structure, long channels (implemented using the first electrodes or the second electrodes) in one or two directions (i.e., the first direction and/or the second direction) are cut or bridged, so as to, on the one hand, be electrically conducted, and on the other hand, eliminate internal stress generated when the base substrate is bent in these directions, thereby preventing cracking of material of a functional layer, effectively ensuring the touch function, and improving the bendability of the flexible touch screen, so that it may be used on current hyperboloid and/or quad curved products.

Next, an exemplary method for manufacturing the touch units 10 according to an embodiment of the present disclosure will be described in detail with reference to FIG. 5.

Figure 5:
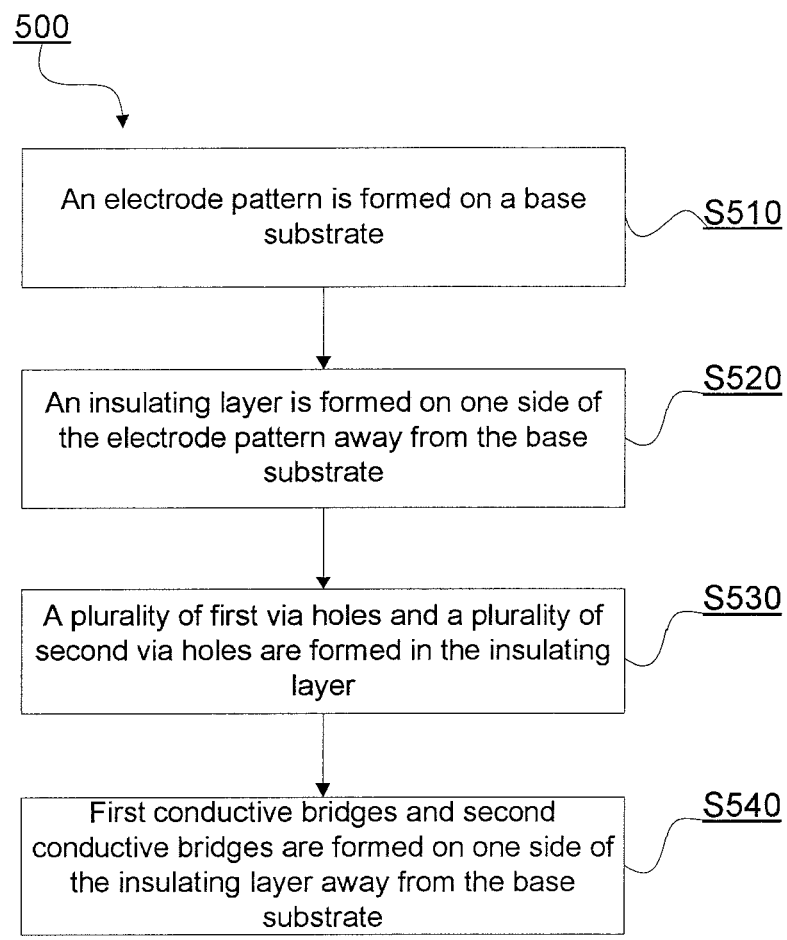
FIG. 5 is a flowchart illustrating an exemplary method for manufacturing a touch unit according to an embodiment of the present disclosure.

FIG. 5 is a flowchart illustrating an exemplary method 500 for manufacturing a touch substrate comprising a plurality of touch units arranged in an array, according to an embodiment of the present disclosure. As shown in FIG. 5, method 500 may comprise steps S510, S520, S530, S540, and S550. According to some embodiments of the present disclosure, some of the steps of method 500 may be performed separately or in combination, may be performed in parallel or sequentially, and are not limited to a specific operational sequence shown in FIG. 5.

Method 500 may start at step S510.

In step S510, an electrode pattern may be formed on a base substrate.

The electrode pattern comprises a plurality of first electrodes (for example, the first electrodes 100) extending in a first direction (for example, a vertical direction) and a plurality of second electrodes (for example, the second electrodes 110) extending in a second direction (for example, a horizontal direction). Here, the second electrodes are disconnected at positions of the first electrodes to form a plurality of portions spaced apart by the plurality of first electrodes. The plurality of second electrodes have gaps (for example, the gaps 104) formed therebetween, and the plurality of first electrodes are also disconnected by the gaps.

In some embodiments, in the electrode pattern formed in step S510, the second electrodes may not only be disconnected at the first electrodes, but also may be disconnected at specific positions where the first electrodes are not disposed (for example, at the gaps 114 between adjacent ones of the touch units in the second direction). With this design, the stress when the base substrate is bent in the second direction may be more effectively reduced.

In step S520, an insulating layer (for example, the insulating layer 140) may be formed on one side of the electrode pattern which is away from the base substrate. Here, the insulating layer covers at least a partial region of various first electrodes and various second electrodes. In some embodiments, the insulating layer covers the entire electrode pattern. In some embodiments, the insulating layer is used to isolate at least a portion of the first electrodes from an adjacent portion of the second electrodes which are spaced apart by the first electrodes. In some embodiments, the insulating layer is further used to isolate the second electrodes which are spaced apart by the gaps from each other, and isolate adjacent portions of the first electrodes which are disconnected at the gaps from each other. In some embodiments, the insulating layer further isolates portions of the second electrodes which are formed to be disconnected at specific positions (at, for example, the gaps 114).

In step S530, a plurality of first via holes and a plurality of second via holes may be formed in the insulating layer.

In some embodiments, a plurality of third via holes may further be formed in the insulating layer.

In step S540, first conductive bridges and second conductive bridges (for example, the first conductive bridges 105 and the second conductive bridges 115) may be formed on one side of the insulating layer which is away from the base substrate, wherein the first conductive bridges electrically connect the disconnected portions (for example, portions located on opposite sides of the gaps 104) of the first electrodes through the first via holes, and the second conductive bridges electrically connect the disconnected portions (for example, portions located on opposite sides of the first electrodes 100) of the second electrodes through the second via holes.

In some embodiments, third conductive bridges (for example, the third conductive bridges 117) may further be formed on one side of the insulating layer which is away from the base substrate, wherein the third conductive bridges electrically connect the disconnected portions (for example, portions located on opposite sides of the gaps 114) of the second electrodes at specific positions (at, for example, the gaps 114) through the third via holes.

With the above method 500, on the one hand, the channels (for example, receiving (RX) or sensing channels) are electrically conducted, and on the other hand, internal stress generated when the base substrate is bent in these directions may be eliminated, thereby preventing cracking of the material of the functional layer, effectively ensuring the touch function, and improving the bendability of the flexible touch screen, so that it may be used on current hyperboloid and/or quad curved products.

A touch substrate and a method for manufacturing the touch substrate according to some other embodiments of the present disclosure will be described in detail below in conjunction with FIGS. 6-8 with reference to FIGS. 1-5.

Figure 6:
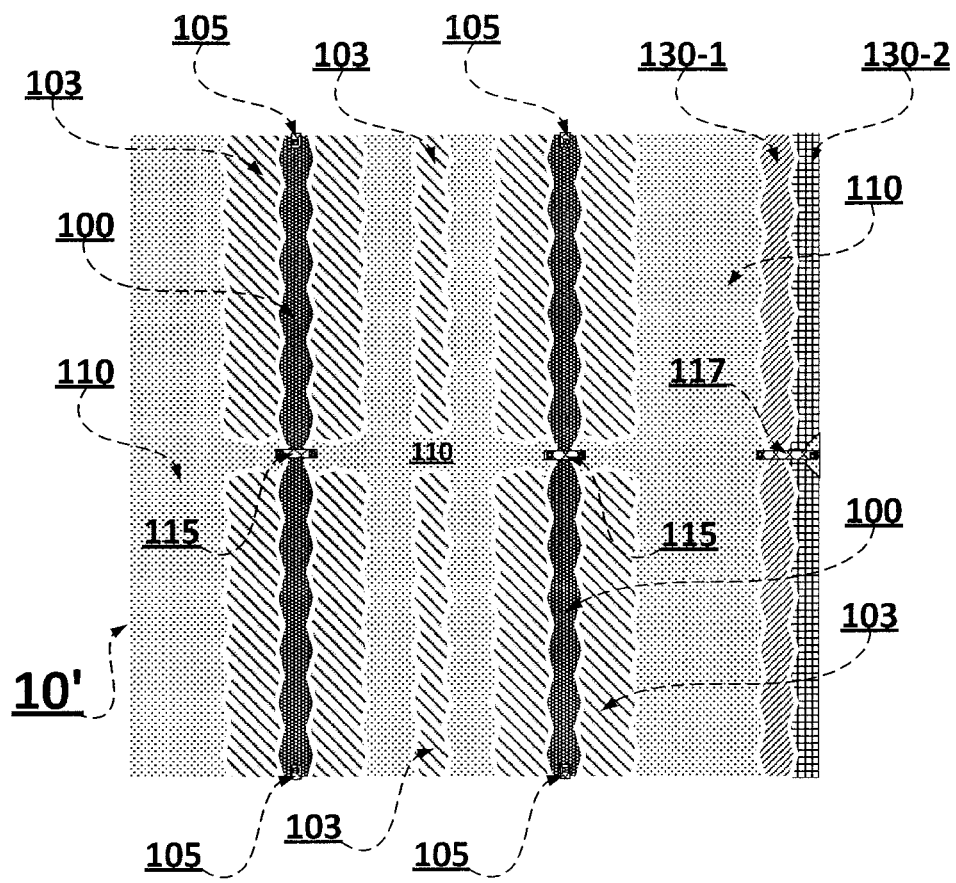
FIG. 6 is a top view illustrating a portion of an exemplary touch substrate according to another embodiment of the present disclosure.

FIG. 6 is a top view illustrating an exemplary touch substrate according to another embodiment of the present disclosure. FIG. 7 is a top view illustrating a plurality of exemplary touch units 10' arranged in an array on a touch substrate according to another embodiment of the present disclosure.

As shown in FIG. 6, similarly to the touch unit 10 shown in FIG. 1, the touch unit 10' on the touch substrate may use a mutual capacitive touch design. The touch unit 10' may comprise two first electrodes 100 extending in, for example, a vertical direction and a second electrode 110 extending in, for example, a horizontal direction. In the embodiment shown in FIG. 6, the second electrode 110 may be a driving electrode (or emitter electrode or Tx), and the first electrodes 100 may be sensing electrodes (or receiver electrodes or Rx). However, the present disclosure is not limited thereto. For example, the first electrodes 100 may be driving electrodes (or emitter electrodes or Tx) and the second electrode 110 may be a sensing electrode (or receiver electrode or Rx).

In the embodiment shown in FIG. 6, in the touch unit 10', the second electrode 110 is disconnected at positions of the two first electrodes 100, that is, the second electrode 110 is divided into a plurality (for example, in the present embodiment, three) of portions by the two first electrodes, wherein various portions of the second electrode 110 are electrically insulated from the first electrodes 100 and are electrically connected through a plurality of second conductive bridges 115 by bridging. The second conductive bridges 115 may bypass the first electrodes 100 as shown in FIG. 8C. As shown in FIG. 8C, the second conductive bridges 115 may be disposed on one side of an insulating layer 140 away from a base substrate 150, and may be configured to electrically connect the plurality of portions (for example, two adjacent portions) of the second electrode 110 through via holes on the insulating layer 140 in the horizontal direction in FIG. 6.

In some embodiments, as shown in FIG. 6, the touch unit 10' may further comprise one or more dummy regions or dummy electrodes 103, which may be used, for example, to increase the transparency or enhance touch performance of the touch unit 10'. The dummy electrodes 103 may be disposed in the same layer as the first electrodes 100 and/or the second electrode 110. Further, the dummy electrodes 103 may be formed of the same material as that of the first electrodes 100 and/or the second electrode 110. As shown in FIG. 6, the dummy electrodes 103 may extend in the vertical direction, for example, the dummy electrodes 103 may have a strip shape with a lengthwise direction being the vertical direction. Further, the plurality of dummy electrodes 103 may be insulated from both the first electrodes 100 and the second electrode 110 and may be configured to be spaced apart by the first electrodes 100 and/or the second electrode 110. In the present disclosure, a number, shapes, and positions of the dummy electrodes 103 are not limited, as long as they do not affect the connectivity of the first electrodes and the connectivity of the second electrode.

Further, as shown in FIG. 6, the above portions (for example, the first electrodes 100 and the second electrode 110, the first electrodes 100 and the dummy electrodes 103, the dummy electrodes 103 and the second electrode 110 etc.) are further insulated from each other by gaps or an insulating material (for example, as indicated by blank lines in FIG. 6).

According to an embodiment of the present disclosure, the second electrode 110 may be configured to conduct a driving signal. The driving signal may generally be a periodic oscillating signal. In a case where mutual capacitance between the first electrode 100 and the second electrode 110 changes due to an action such as touch using a finger, a stylus etc., a period/frequency of the oscillating signal changes therewith, and thereby an output signal of the first electrode 100 changes, which may be detected by a driving circuit (for example, a driving circuit (IC) of a touch panel or a driving circuit of a touch display) connected to the first electrode 100. The first electrode 100 may be configured to sense a change in the mutual capacitance between the first electrode 100 and the second electrode 110.

Figure 7:
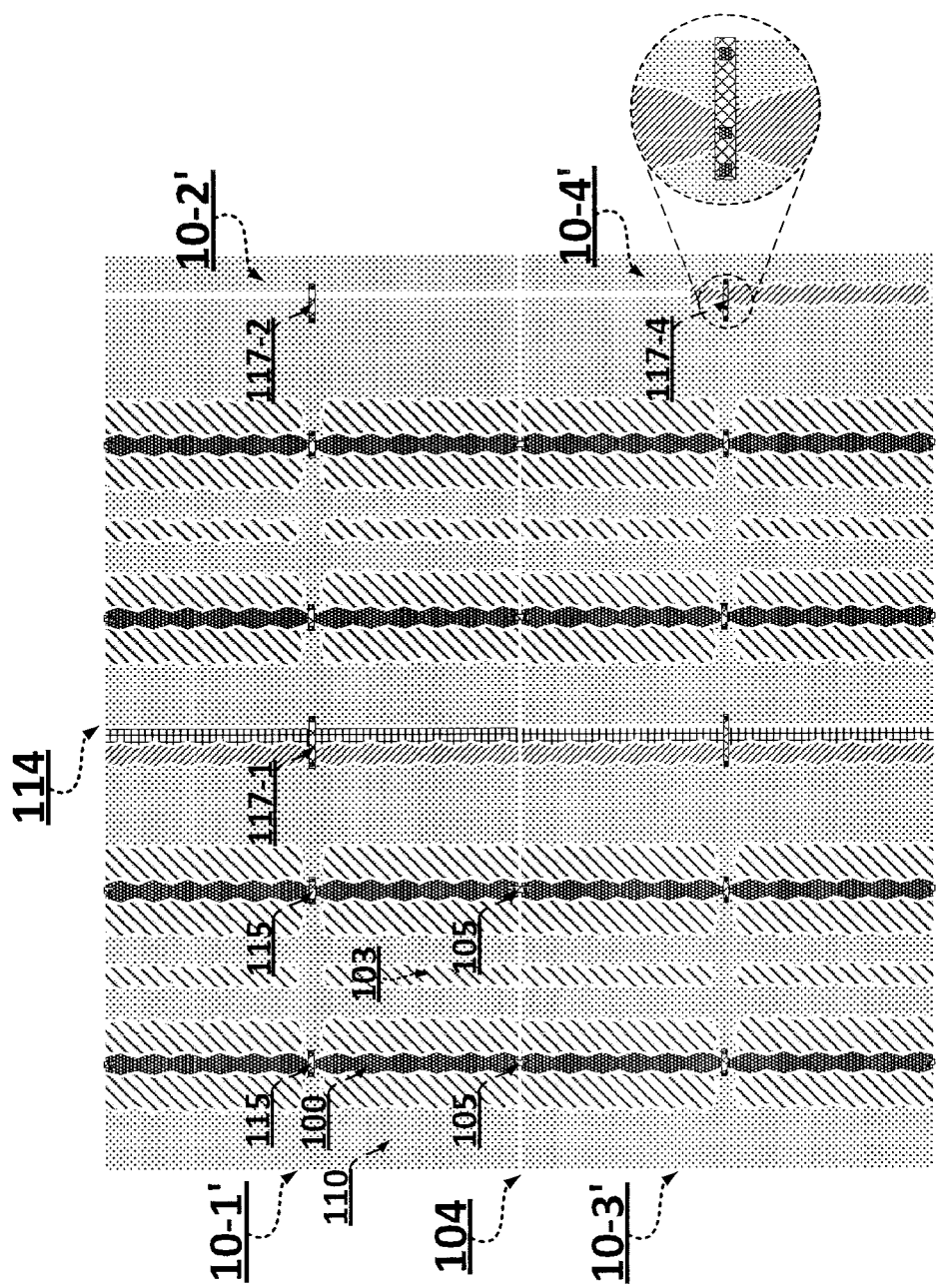
FIG. 7 is a top view illustrating a plurality of exemplary touch units arranged in an array on an exemplary touch substrate according to another embodiment of the present disclosure.

In addition, as shown in FIG. 7, the adjacent ones of the touch units 10' (comprising, for example, the touch units 10-1', 10-2', 10-3', 10-4', etc., which are collectively referred to as touch units 10' hereinafter, unless otherwise specified) may have gaps 104 and/or 114 formed therebetween. In some embodiments, the gaps 104 are formed between vertically adjacent touch units 10', and the gaps 114 are formed between horizontally adjacent touch units 10'.

For example, in the embodiment shown in FIG. 7, a gap 104 similar to that in the embodiment shown in FIG. 2 is formed between the touch unit 10-1' and the touch unit 10-3'. The gap 104 may be formed while patterns of the touch units 10' are formed, as in the method described in connection with FIGS. 8A-8C, or may be subsequently formed by, for example, laser, etching, etc. after the process of the entire touch panel is completed.

In a case of a design of, for example, a flexible touch unit, the gap 104 may become a release space for internal stress generated by the touch panel when the touch panel is bent (with, for example, the gap 104 as an axis), thereby avoiding or at least reducing possible mechanical damages, for example, breakage, tearing, etc., to the device. In addition, in this case, a portion of first electrodes 100 of the touch unit 10-1' and a portion of first electrodes 100 of the touch unit 10-3' may be electrically connected through first conductive bridges 105, so that the respective first electrodes 100 of the same column of touch units 10' are electrically connected.

It should be illustrated that although in the embodiment shown in FIG. 7, the gap 104 is a gap throughout the entire touch panel, the present disclosure is not limited thereto. In fact, the gap 104 may be partially present. For example, there may be a gap 104 between the touch units 10-1' and 10-3', and there may not be a gap 104 between the touch units 10-2' and 10-4'. This is due, at least in part, to the fact that when there is a gap 104 throughout the entire row, the entire touch display may be bent intensively, which results in tearing or breakage of an underlying base substrate/flexible display panel due to the lack of protection by a touch panel layer. Therefore, it is necessary to retain portions without a gap to improve the toughness of the entire touch display.

Similarly, a gap 114 may be formed between the touch unit 10-1' and the touch unit 10-2'. In the case of the design of, for example, a flexible touch unit, the gap 114 may become a release space for internal stress generated by the touch panel when the touch panel is bent (with, for example, the gap 114 as an axis), thereby avoiding or at least reducing possible mechanical damages, for example, breakage, tearing, etc., to the device. In other words, the second electrode 110 is disconnected at the gap 114 to form a plurality of portions. In addition, in this case, a portion of a second electrode 110 in the touch unit 10-1' and a portion of a second electrode 110 in the touch unit 10-2' may be electrically connected through a third conductive bridge 117-1 disposed in the horizontal direction, so that various second electrodes 110 are electrically conducted. As shown in FIG. 8C, the third conductive bridge 117-1 may be disposed on one side of the insulating layer 140 away from the base substrate 150, and may be configured to connect portions of the second electrodes 110 in the adjacent touch units 10-1' and 10-2' which are arranged in the horizontal direction shown in FIG. 6 through a via hole on the insulating layer 140. It should be illustrated that although in the embodiment shown in FIG. 7, the gap 114 is a gap throughout the entire touch panel, the present disclosure is not limited thereto. In fact, the gap 114 may be partially present. For example, for the same reasons as those described above, there may be a gap 114 between the touch units 10-1' and 10-2', and there may not be a gap 114 between the touch units 10-3' and 10-4'.

Further, in the embodiment shown in FIG. 7, in addition to the gaps 104/114 between adjacent ones of the plurality of touch units 10', there may also be gaps between the touch units 10' and adjacent bonding regions, for example, between an outermost one of the touch units 10' arranged in an array which is close to a bonding region and the bonding region. Therefore, similarly, first electrodes 100 and/or a second electrode 110 of the touch unit may be electrically connected to a corresponding lead of an adjacent bonding region by a conductive bridge similar to the first conductive bridge 105 and/or the third conductive bridge 117 described above.

Further, in the embodiment shown in FIG. 6, the touch unit 10' may further comprise two signal lines 130-1 and 130-2 extending in the vertical direction. As described above, in the embodiment shown in FIG. 6, the signal lines originally disposed at a bezel of the screen may be dispersed into and/or between the respective touch units, thereby effectively achieving a design with a narrow bezel or a design without a bezel. As shown in FIG. 6, the two signal lines 130-1 and 130-2 pass through the touch unit 10', and gaps are formed between the two signal lines 130-1 and 130-2 and the second electrode 110 to insulate the two signal lines 130-1 and 130-2 from the second electrode 110. In some embodiments, any one or two of the two signal lines 130-1 and 130-2 may be electrically connected to a second electrode 110 of one of a certain row of touch units 10' (for example, also by way of bridging), so as to provide a driving signal to the row of touch units 10'.

Therefore, in addition, unlike the example of FIG. 6, one of the signal lines 130-1 and 130-2 may be electrically connected to second electrodes 110, for example, as shown in FIG. 7, a third conductive bridge 117-4 in the touch unit 10-4' connects signal lines 130 to second electrodes 110 on opposite sides thereof. It should be illustrated that a portion on the right side of the third conductive bridge 117-4 which is connected to an adjacent touch unit is not shown, and only a portion on the left side of the third conductive bridge 117-4 which is electrically connected to the second electrode 110 and the signal lines in the touch unit 10-4' is shown. In addition, like the third conductive bridge 117-1, the third conductive bridge 117-4 may also bypass the gap 114 between the touch units. In some other embodiments, the signal lines 130 may also be integrally formed with the second electrode 110, for example, while patterns of the first electrodes, the second electrode, and/or the signal lines are formed. In some embodiments, the signal lines 130 may also not be disposed in the same layer as the first electrodes and/or the second electrode. In this case, the signal lines 130 may also be formed separately from the first electrodes and the second electrode. In addition, as described above, there may be only one signal line 130 in the touch unit 10', as shown by a single signal line in the touch units 10-2' and 10-4' in FIG. 7. In addition, as described above, the signal line 130-1 or 130-2 may not exist in the touch unit 10', for example, when there are other touch units connected to a signal line in the same row of touch units as the touch unit 10'. Further, as described above, there may not be a signal line 130 in the touch unit 10'. For example, as shown in FIG. 7, there may not be a signal line 130 in the touch unit 10-2'. In this case, the second electrode 110 of the touch unit 10-2' may obtain a driving signal from other touch units 10' in the same row of touch units 10' as the touch unit 10-2'.

In addition, as shown in FIG. 7, the signal lines 130-1 and 130-2 (collectively referred to as signal lines 130 hereinafter, unless otherwise stated) may be configured to be not disconnected between adjacent touch units 10', that is, there is no gap 104 at the signal lines 130. In some other embodiments, similarly to the first electrodes 100, the signal lines 130 may also bypass the gap 104 by way of bridging. In the embodiment shown in FIG. 7, the signal lines 130 of the same column of touch units 10' are connected (but not necessarily pass through all of the touch units in the same column of touch units), and touch units 10' at, for example, end points of the column of touch units may be electrically connected to leads of respective adjacent bonding regions. Thereby, signal lines which should originally be disposed on the left and right sides of the entire touch panel are dispersed into one or more touch units 10' in each row, which makes it possible to achieve a design without a bezel/with a narrow bezel. In addition, as shown in FIG. 6, the second electrode 110 in the touch unit 10' may also be electrically connected to a second electrode 110 in an adjacent touch unit 10' via a third conductive bridge 117 across the signal lines 130. In some embodiments, signal lines 130 in adjacent touch units 10' may be integrally formed, for example, when patterns of the signal lines are formed.

Further, although there are two first electrodes 100 extending (for example, in parallel) in the first direction in each of the above touch units 10', the embodiments of the present disclosure are not limited thereto. In fact, one, three or more first electrodes 100 may also be used, which is not limited in the present disclosure. In addition, although description is made by taking the mutual capacitive touch solution as an example in the above embodiments, the present disclosure is not limited thereto. For example, a self-capacitive touch solution may also be implemented by disposing gaps between the respective touch units and connecting the touch units using the respective conductive bridges, so as to ensure that the internal stress is released.

Next, an exemplary method for manufacturing touch units according to an embodiment of the present disclosure will be described in detail with reference to FIGS. 8A to 8C.

Figure 8A:
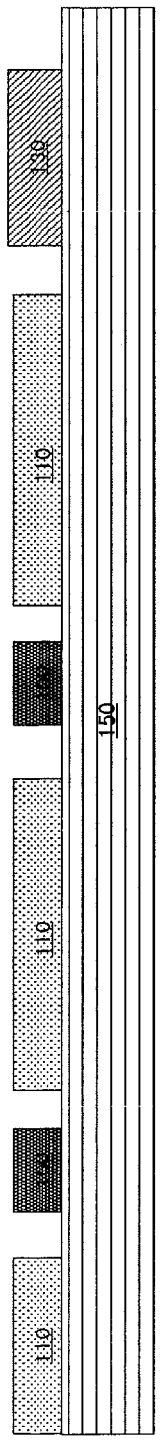
FIGS. 8A-8C are partial cross-sectional views illustrating a touch substrate in various manufacturing phases according to another embodiment of the present disclosure.
Figure 8B:
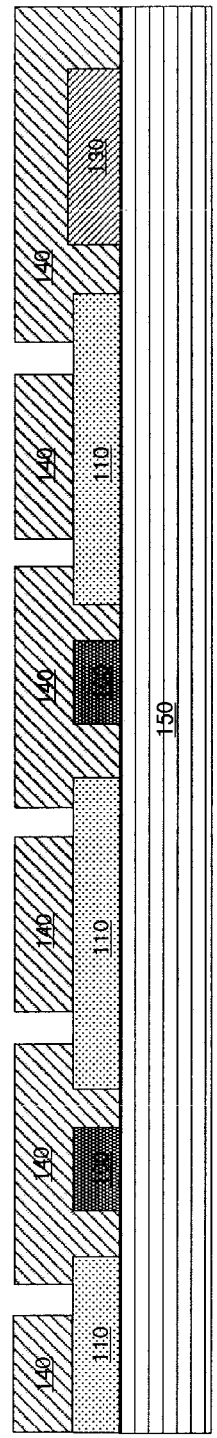
Figure 8C:
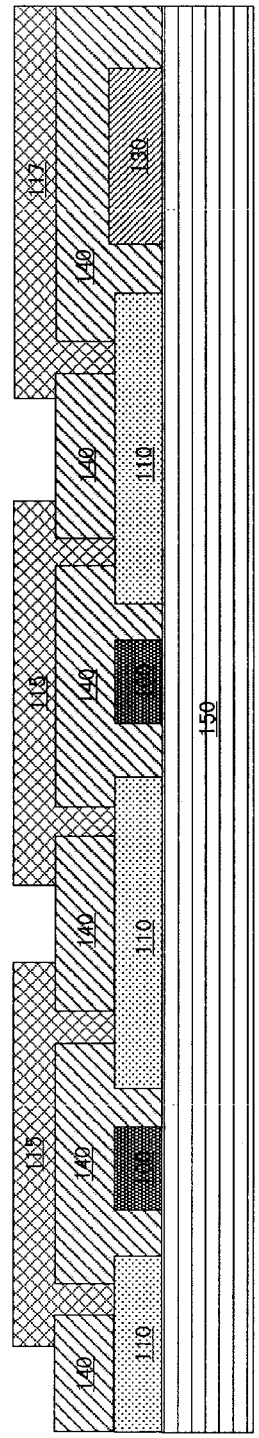

FIGS. 8A to 8C are partial cross-sectional views illustrating the touch units 10' in various phases of an exemplary method for manufacturing the touch units 10' according to another embodiment of the present disclosure. Similarly to the embodiment shown in FIGS. 3A-3C, a pattern layer of various electrodes 100 and/or 110 and optical signal lines 130 may be formed by performing magnetron sputtering on, for example, a flexible and/or rigid base substrate (of, for example, Cycio Olefins Polymer (COP), Polyethylene terephthalate (PET), glass, etc.) This layer may be made of a transparent ITO conductive material, and desired electrode pattern and signal line pattern are formed by a yellow light process, comprising steps such as photoresist coating, exposure, development, etching, etc. Further, in this step, gaps between patterns of the respective touch units 10', patterns of dummy electrodes 103 in each of the touch units 10', etc. may also be formed at the same time. Alternatively, in some other embodiments, the gaps may also be formed by, for example, laser, etching, etc. after the above patterns are formed.

Next, as shown in FIG. 8B, an intermediate insulating layer 140 may be formed by, for example, vapor deposition or coating. The insulating layer 140 may be formed by a transparent organic layer (of, for example, Optical Clear Adhesive (OCA), polyimide (PI), etc.) or a transparent inorganic substance (inorganic silicon oxide material, oxynitride, etc.), and required patterns of the insulating layer 140 may be formed by a yellow light process. Via holes etc. required in subsequent steps may also be formed while the patterns of the insulating layer 140 are formed. Likewise, the via holes formed in this layer may also be subsequently formed by, for example, laser, etching, etc. after the insulating layer 140 is formed, instead of being formed while the patterns of the insulating layer 140 are formed.

Finally, as shown in FIG. 8C, the first conductive bridges 105, the second conductive bridges 115 and/or the third conductive bridges 117 etc. (the second conductive bridges 115 and the third conductive bridges 117 are used as an example in FIG. 8C) may be formed by magnetron sputtering. Material of the first conductive bridges 105, the second conductive bridges 115, and/or the third conductive bridges 117 may be the same as that of various electrodes/signal lines. The desired patterns of the conductive bridges are formed by a yellow light process, comprising, for example, photoresist coating, exposure, development, etching etc., to complete the manufacturing of the entire touch units 10.

Further, in a case where the design of the touch units 10' shown in FIGS. 6 and 7 is used, the manufacturing method 500 shown in FIG. 5 may further be improved. In some embodiments, the method 500 may further comprise: forming signal lines (for example, the signal lines 130-1 and/or 130-2) extending in the first direction on the base substrate, so that the second electrodes are disconnected at positions of the signal lines. In addition, the signal lines may be electrically connected to a certain second electrode (for example, the second electrode 110 corresponding to the touch unit 10-4' in FIG. 7), and may be configured to transmit a control signal to the second electrode, and/or receive a sensing signal from the second electrode (for example, in a case where the second electrode is a receiving electrode or a sensing electrode). The signal lines are arranged between the respective touch units and are connected only to a certain second electrode, so that the signal lines originally disposed at an edge of the touch panel may be dispersed into the touch units, which may more effectively achieve a touch panel with a narrow bezel or without a bezel.

In some embodiments, the electrode pattern formed in step S510 of method 500 may further comprise a plurality of dummy electrodes (for example, the dummy electrodes 103 shown in FIG. 6), which may be disposed in the same layer as the first electrodes and the second electrodes, use the same material as that of the first electrodes and the second electrodes, and extend in the first direction. Further, the plurality of dummy electrodes may be insulated from both the first electrodes and the second electrodes and may be configured to be spaced apart by the first electrodes and/or the second electrodes. The dummy electrodes are disposed to improve the touch performance and transparency of the touch units, so as to achieve better user experience.

Figure 9:
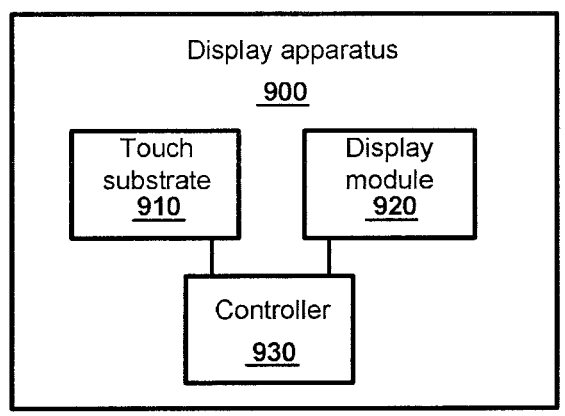
FIG. 9 is a schematic block diagram illustrating a display apparatus comprising a touch substrate according to an embodiment of the present disclosure.

FIG. 9 is a schematic block diagram illustrating a display apparatus 900 comprising a touch substrate 910 according to an embodiment of the present disclosure. As shown in FIG. 9, the display apparatus 900 may comprise the touch substrate 910, a display module 920, and a controller 930. The touch substrate 910 may be a touch substrate 910 (for example, the touch substrate shown in FIG. 2 or FIG. 7) having a plurality of touch units 10 and/or 10' arranged in an array as described above, and may be used to sense operations such as touch, proximity etc. which are performed by an object such as a finger, a stylus etc. on the touch units of the touch substrate 910, and provide a sensed coordinate position to the controller 930 for performing corresponding processing. The display module 920 may be, for example, a Liquid Crystal Display (LCD) module, an Organic Light Emitting Diode (OLED) display module, etc., and may be used to display an output image under control of the controller 930. In some embodiments, the touch substrate 910 may be combined with the display module in various manners, for example, by a One Glass Solution (OGS for short) method. The controller 930 may be, for example, a dedicated control circuit such as an Application Specific Integrated Circuit (ASIC), a Field Programmable Gate Array (FPGA), a Micro-Controller Unit (MCU) etc., or a general processor/controller which incorporates software and/or firmware such as a Central Processing Unit (CPU), a Graphics Processing Unit (GPU) etc.

Therefore, with a touch substrate, a method for manufacturing the touch substrate, and a display apparatus according to an embodiment of the present disclosure, compared with a caterpillar type or "E" type single layer structure, long channels (implemented using the first electrodes or the second electrodes) in two directions which are perpendicular to each other are cut or bridged, so as to, on the one hand, be electrically conducted, and on the other hand, eliminate internal stress generated when the base substrate is bent in the two directions, thereby preventing cracking of material of a functional layer, effectively ensuring the touch function, and improving the bendability of the flexible touch screen, so that it may be used on current hyperboloid and/or quad curved products.

In addition, channels of the signal lines are designed between the respective touch units without arranging the signal lines on opposite sides of the touch screen, which makes it possible to design a touch screen without a bezel. In addition, some of bridge points are transferred to edges of the touch units, which reduces a density of central bridge points, thereby effectively improving the visibility effect of the bridge points.

In addition, in some embodiments, the above touch units are designed to not only be suitable for the common ITO solution, but also be suitable for the APC solution. Although it is necessary to increase the transmittance of APC by reducing a thickness of APC, the APC solution still has better touch performance than that of the ITO solution having large square resistance. In addition, the design of the touch units is not only suitable for a rigid touch screen, but also more suitable for a flexible touch screen, especially a quad curved flexible touch screen.

The present disclosure has been described so far in connection with the preferred embodiments. It should be understood that various other changes, substitutions and additions may be made by those skilled in the art without departing from the spirit and scope of the present disclosure. Therefore, the scope of the present disclosure is not limited to the specific embodiments described above, but should be defined by the appended claims.

In addition, functions described herein as being implemented by pure hardware, pure software, and/or firmware may also be implemented by dedicated hardware, a combination of general-purpose hardware and software, etc. For example, functions described as being implemented by dedicated hardware (for example, a Field Programmable Gate Array (FPGA), an Application Specific Integrated Circuit (ASIC), etc.) may be implemented by a combination of general-purpose hardware (for example, a Central Processing Unit (CPU), a Digital Signal Processor (DSP)) and software, and vice versa.

We claim:

1. A touch substrate, comprising:
   a base substrate;
   an electrode pattern, comprising a plurality of first electrodes extending in a first direction and a plurality of second electrodes extending in a second direction intersecting the first direction, wherein the plurality of second electrodes and the plurality of first electrodes are disposed in the same layer and constitute a plurality of touch units arranged in an array, wherein the second electrodes are disconnected at positions of the plurality of first electrodes, are insulated from the plurality of first electrodes, and have first gaps set between adjacent second electrodes thereof, and the first electrodes are disconnected at the first gaps;
   an insulating layer disposed on one side of the electrode pattern which is away from the base substrate, wherein the insulating layer has a plurality of first via holes and a plurality of second via holes disposed therein;
   first conductive bridges disposed on one side of the insulating layer which is away from the base substrate, wherein an orthographic projection of each of the first conductive bridges on the base substrate is at least partially overlapped with an orthographic projection of a corresponding one of the plurality of first via holes on the base substrate, and the first conductive bridges are configured to electrically connect portions of respective first electrodes on opposite sides of respective first gaps; and
   second conductive bridges disposed on one side of the insulating layer which is away from the base substrate, wherein an orthographic projection of each of the second conductive bridges on the base substrate is at least partially overlapped with an orthographic projection of a corresponding one of the plurality of second via holes on the base substrate, and the second conductive bridges are configured to electrically connect disconnected portions of respective second electrodes,
   wherein the electrode pattern further comprises:
      at least one dummy electrode disposed in the same layer as the first electrodes and the second electrodes and extending in the first direction,
      wherein the dummy electrodes are insulated from the first electrodes and the second electrodes.

2. The touch substrate according to claim 1, wherein the second electrodes are further configured to be disconnected at second gaps, which are located between adjacent ones of the touch units in the second direction.

3. The touch substrate according to claim 2, further comprising:
   signal lines extending in the first direction, wherein the signal lines are located at the second gaps, and are disposed in the same layer as the electrode pattern,
   wherein the signal lines are electrically connected to at least one of the plurality of second electrodes, and the signal lines are configured to perform at least one of: transmitting a control signal to the second electrode electrically connected thereto or receiving a sensing signal from the second electrode electrically connected thereto.

4. The touch substrate according to claim 2, wherein the insulating layer further has a plurality of third via holes disposed therein, and
   the touch substrate further comprises:
      third conductive bridges disposed on one side of the insulating layer which is away from the base substrate, wherein an orthographic projection of each of the third conductive bridges on the base substrate is at least partially overlapped with an orthographic projection of a corresponding one of the plurality of third via holes on the base substrate, and the third conductive bridges are configured to electrically connect portions of respective second electrodes on opposite sides of respective second gaps.

5. The touch substrate according to claim 1, wherein the first electrodes and the second electrodes are formed of the same material.

6. The touch substrate according to claim 3, wherein the signal lines, the first electrodes, and the second electrodes are formed of the same material.

7. The touch substrate according to claim 1, wherein the dummy electrodes, the first electrodes, and the second electrodes are formed of the same material.

8. The touch substrate according to claim 1, wherein the first direction is perpendicular to the second direction.

9. The touch substrate according to claim 1, wherein material of the first electrodes and the second electrodes comprises indium tin oxide or a silver palladium copper alloy.

10. A method for manufacturing a touch substrate, comprising:
    forming an electrode pattern on a base substrate, wherein the electrode pattern comprises a plurality of first electrodes extending in a first direction and a plurality of second electrodes extending in a second direction intersecting the first direction, wherein the plurality of second electrodes and the plurality of first electrodes are disposed in the same layer and constitute a plurality of touch units arranged in an array, the second electrodes are formed to be disconnected at positions of the plurality of first electrodes, are insulated from the plurality of first electrodes, and have first gaps set between adjacent second electrodes thereof, and the first electrodes are formed to be disconnected at the first gaps;

forming an insulating layer on one side of the electrode pattern which is away from the base substrate;

forming a plurality of first via holes and a plurality of second via holes in the insulating layer; and forming first conductive bridges and second conductive bridges on one side of the insulating layer which is away from the base substrate, wherein the first conductive bridges are formed to electrically connect portions of respective first electrodes on opposites sides of respective first gaps via the first via holes, and the second conductive bridges are formed to electrically connect disconnected portions of respective second electrodes via the second via holes, wherein the electrode pattern is further formed to comprise:
at least one dummy electrode disposed in the same layer as the first electrodes and the second electrodes and extending in the first direction,
wherein the dummy electrodes are insulated from the first electrodes and the second electrodes.

11. The method according to claim 10, wherein the second electrodes are further formed to be disconnected between adjacent ones of the touch units in the second direction to form second gaps.

12. The method according to claim 11, further comprising:
forming, at the second gaps on the base substrate, signal lines extending in the first direction, wherein the signal lines are disposed in the same layer as the electrode pattern,
wherein the signal lines are formed to be electrically connected to at least one of the plurality of second electrodes.

13. The method according to claim 11, further comprising:
forming a plurality of third via holes in the insulating layer; and
forming third conductive bridges on one side of the insulating layer which is away from the base substrate, wherein the third conductive bridges are formed to electrically connect portions of respective second electrodes on opposite sides of respective second gaps via the third via holes.

14. The method according to claim 10, wherein the first electrodes and the second electrodes are formed of the same material.

15. The method according to claim 12, wherein the signal lines, the first electrodes, and the second electrodes are formed of the same material.

16. The method according to claim 10, wherein the dummy electrodes, the first electrodes, and the second electrodes are formed of the same material.

17. The touch substrate according to claim 10, wherein the first direction is perpendicular to the second direction.

18. The touch substrate according to claim 10, wherein material of the first electrodes and the second electrodes comprises indium tin oxide or a silver palladium copper alloy.

19. A display apparatus, comprising the touch substrate according to claim 1.

20. The touch substrate according to claim 3, wherein the insulating layer further has a plurality of third via holes disposed therein, and
the touch substrate further comprises:
third conductive bridges disposed on one side of the insulating layer which is away from the base substrate, wherein an orthographic projection of each of the third conductive bridges on the base substrate is at least partially overlapped with an orthographic projection of a corresponding one of the plurality of third via holes on the base substrate, and the third conductive bridges are configured to electrically connect portions of respective second electrodes on opposite sides of respective second gaps.

* * * * *